United States Patent
Lin (10) Patent No.: US 10,150,246 B2
(45) Date of Patent: Dec. 11, 2018

(54) METHOD FOR SURFACE TREATMENT OF THERMOPLASTIC POLYURETHANE TEXTURE WITH LAMINATED DEEP AND SHALLOW DRAWINGS

(71) Applicant: DingZing Advanced Materials Inc., Kaohsiung (TW)

(72) Inventor: Keng-Hsien Lin, Kaohsiung (TW)

(73) Assignee: DingZing Advanced Materials Inc., Kaohsiung (TW)

( * ) Notice: Subject to any disclaimer, the term of this patent is extended or adjusted under 35 U.S.C. 154(b) by 337 days.

(21) Appl. No.: 14/925,347

(22) Filed: Oct. 28, 2015

(65) Prior Publication Data

US 2017/0120502 A1     May 4, 2017

(51) Int. Cl.

| | |
|---|---|
| *B29C 59/04* | (2006.01) |
| *B29C 44/56* | (2006.01) |
| *B29C 59/02* | (2006.01) |
| *B29K 75/00* | (2006.01) |
| *B29K 105/00* | (2006.01) |
| *B29K 105/04* | (2006.01) |
| *B29C 35/08* | (2006.01) |
| *B29K 101/12* | (2006.01) |

(52) U.S. Cl.
CPC .......... *B29C 59/04* (2013.01); *B29C 44/5636* (2013.01); *B29C 59/022* (2013.01); *B29C 2035/0822* (2013.01); *B29K 2075/00* (2013.01); *B29K 2101/12* (2013.01); *B29K 2105/04* (2013.01); *B29K 2105/256* (2013.01); *B29K 2995/006* (2013.01); *B29K 2995/007* (2013.01)

(58) Field of Classification Search
CPC ..... B29C 59/002; B29C 59/04; B29C 59/026; B29C 44/5627; B29C 44/5636
See application file for complete search history.

(56) References Cited

U.S. PATENT DOCUMENTS

| | | | | |
|---|---|---|---|---|
| 4,211,743 A | * | 7/1980 | Nauta | B29C 51/22 264/284 |
| 4,747,901 A | * | 5/1988 | Becker | B29C 59/026 156/220 |
| 5,897,930 A | * | 4/1999 | Calhoun | B29C 59/022 428/41.8 |
| 2003/0218274 A1 | * | 11/2003 | Boutilier | B31F 1/07 264/284 |
| 2011/0221094 A1 | * | 9/2011 | Gross | A61F 13/15707 264/284 |

* cited by examiner

*Primary Examiner* — Stella K Yi (57) ABSTRACT

A method for the surface treatment of a thermoplastic polyurethane texture to provide laminated deep and shallow impressions, includes first preparing an unfinished thermoplastic polyurethane sheet. Then, a surface of the unfinished sheet is roll pressed by a first embossed roller set so that a shallow impression is printed onto it to obtain a first embossed sheet. The first embossed sheet is double pressed by a second embossed roller set so that a deep impression is printed onto it to obtain a second embossed sheet with laminated shallow and deep impressions. Finally, the second embossed sheet is cut into predetermined lengths to provide the thermoplastic polyurethane texture.

7 Claims, 7 Drawing Sheets

METHOD FOR SURFACE TREATMENT OF THERMOPLASTIC POLYURETHANE TEXTURE WITH LAMINATED DEEP AND SHALLOW DRAWINGS

BACKGROUND OF THE INVENTION

1. Field of the Invention

The present invention relates to thermoplastic polyurethane textures, and more particularly to a method for the surface treatment of thermoplastic polyurethane textures with laminated deep and shallow impressions.

2. Description of the Related Art

The flexibility of PVC can be changed by way of an added plasticizer, and so manufacturers can easily create products with various flexibilities and shapes which are commonly found. However, PVC has poor high thermal resistance, poor flex resistance and poor impact absorption. Furthermore, dioxin, chlorine, heavy metal particulates and such poisonous substances are produced when products are disposed in high thermal environments or burned, and these toxins severely threaten our daily life and health. Therefore, with recent rise in environmental awareness, environmental materials are preferred for the production of products; for example, TPU is substituted for PVC.

To be specific, TPU is a kind of macromolecule elastomer provided with no plasticizer, and its physical properties are between rubber and plastic. When present as a rubber/plastic material, TPU provides wear resistance, flex resistance, high tensile, high tear strength and resistance to low temperatures, and it is also a form of non-toxic, environmental material, and so it can be extensively applied to shoes, sporting goods, clothing, medical supplies and so on.

With technological advances, consumers not only have requirements for product specifications and functions, but also care about product appearance when shopping. Taking the casing of a consumer electronic product for example, manufacturers usually print impressions onto the surface of the casing, which provides unique patterns and feelings to attract the consumers' attention.

Figure 1:
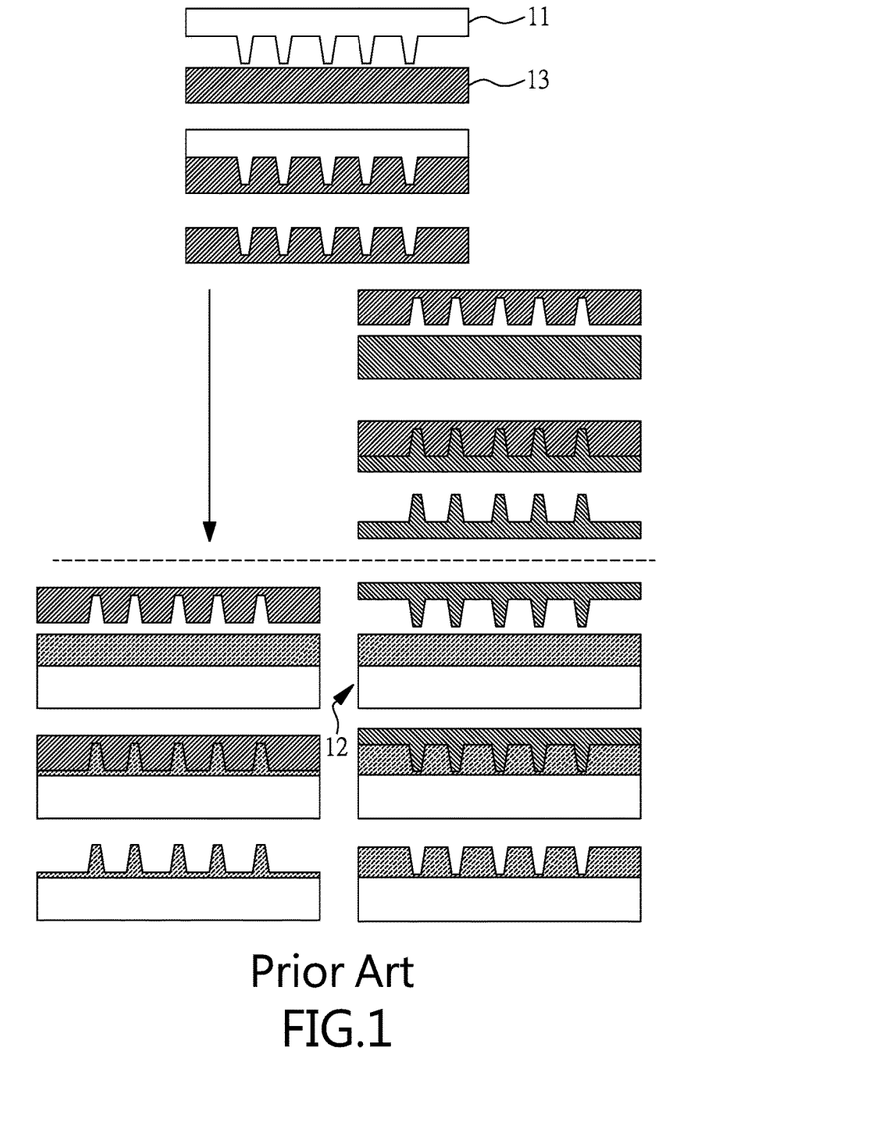
FIG. 1 is a flowchart of a prior art device disclosed in Taiwan Invention Patent No. I392592, showing an apparatus for pattern replication with an intermediate stamp.

Please refer to FIG. 1, which concerns Taiwan Invention Patent No. I392592, entitled "Apparatus for Pattern Replication with Intermediate Stamp", which operates mutually and simultaneously to perform a second step. In the first transfer printing unit, the impression duplication of a template 11 is formed in or on an intermediate disk, or to be better formed in or on a flexible polymer foil 13 by a transfer printing unit to obtain an intermediate stamp, and the polymer foil 13 is made from thermoplastic polymer, thermosetting polymer, or polymer. The intermediate stamp is moved from the first transfer printing unit to the second transfer printing unit, and in the second transfer printing unit, the intermediate stamp is utilized to transfer print the impression onto the moldable layer of a substrate 12 target surface by a second step.

From the above descriptions, certain problems still exist in the prior art method:

1. Increased Defect Rate in the Process

The impression structure on the surface can be transfer printed onto the flexible polymer foil 13 by the template 11 to form a decorated impression on it. However, the above surface decoration technique is mostly utilized to decorate the surface only once; if the technique is repeated a second time, the existing decorated impression will be damaged and the defect rate will be increased in the process.

2. Complicated, Time-wasting Process

The prior art utilizes a double transfer printing process, and the transfer printing process of the second surface is performed after the first one has solidified. Therefore, this kind of process wastes time and resources.

3. No Enhancement of Visual Impressions

The embossment is only able to be formed on the surface of the flexible polymer foil 13 by the template 11, but no vertical side decorative impressions can be formed, and so there is no 3D stylish decoration effect. Therefore, it cannot meet consumer requirements for visual impressions.

The above disadvantages express the problems of the current apparatus for pattern replication with intermediate stamp. Therefore, it is desirable to provide a device which can improve the present disadvantages in processing, or to provide a design for improving product yield rates, while enhancing the visual impression to satisfy the consumer requirements, and obtain competitive advantages in the market.

SUMMARY OF EMBODIMENTS OF THE INVENTION

Therefore, an objective of an embodiment of the present invention is to provide a method for surface treatment of a thermoplastic polyurethane texture with laminated deep and shallow impressions comprising the following steps.

First, an unfinished thermoplastic polyurethane sheet is prepared. Next, a surface of the unfinished sheet is roll pressed by a first embossed roller set and a shallow impression is printed onto it to obtain a first embossed sheet. Then, the first embossed sheet with the shallow impression is double pressed by a second embossed roller set and a deep impression is printed onto it to obtain a second embossed sheet with laminated shallow and deep impressions. Finally, the second embossed sheet is cut into predetermined lengths to obtain the thermoplastic polyurethane texture.

Another technique of an embodiment of the present invention is that the unfinished sheet is made by the steps in which a thermoplastic polyurethane material is prepared and after being melted, is extruded in predetermined amounts to obtain an intermediate unfinished sheet.

Another technique of an embodiment of the present invention is that the first roller set is provided with two opposing first rollers and a heating unit connected to the two first rollers. The heat is directed into the first roller set by the heating unit to heat up the roll pressed unfinished sheet. Moreover, the temperature of the heat is between 25° C. and 100° C.

Another technique of an embodiment of the present invention is that the second roller set is provided with two opposing rollers, and a cooling unit is connected to the two second rollers. A coolant is directed into the two second rollers by the cooling unit, so the first roll pressed embossed sheet can be cooled and fixed during pressing.

Another technique of an embodiment of the present invention is that after the shallow impression has been printed onto the surface by the first roller set for an interval of 1 to 10 seconds, the deep impression is printed onto the surface by the second roller set.

Another technique of an embodiment of the present invention is that the thermoplastic polyurethane material is foamed by way of an added vesicant.

Another technique of an embodiment of the present invention is that the thermoplastic polyurethane material can include one or more of methylene diphenyl diisocyanate, tolylene diisocyanate, polyether polyol, polycarbonate polyol.

Another technique of an embodiment of the present invention is that the hardness of the thermoplastic polyurethane material is in the range of 45 Shore D to 85 Shore A.

Another technique of an embodiment of the present invention is that the temperature of the coolant is between 25° C. and −20° C.

Another technique of an embodiment of the present invention is that the unfinished sheet is irradiated by an infrared lamp to maintain a predetermined temperature. Moreover, the irradiation temperature of the infrared lamp is between 25° C. and 120° C.

An advantage of embodiments of the invention is that through the shallow and deep impressions printed by the first and the second roller set, and a side impression formed at a different depth, the second embossed sheet with laminated shallow and deep impressions is obtained, so it can achieve an overall 3D decoration effect to satisfy the consumer requirements for visual impressions. Furthermore, the coolant is directed into the second roller set by the cooling unit to cool and fix the first roll pressed embossed sheet during pressing, and the shallow and deep impressions of the second embossed sheet can be fixed, so the processing time is shortened to prevent the impressions from being deformed or sticking together and the yield rate can be improved.

DETAILED DESCRIPTION OF THE PREFERRED EMBODIMENTS

Specific structural and functional details disclosed herein will become apparent from the following descriptions of the three preferred embodiments of the present invention taken in conjunction with the accompanying drawings.

Before explaining the present method in detail, it is to be understood that similar elements are labeled with the same reference numbers.

Figure 2:
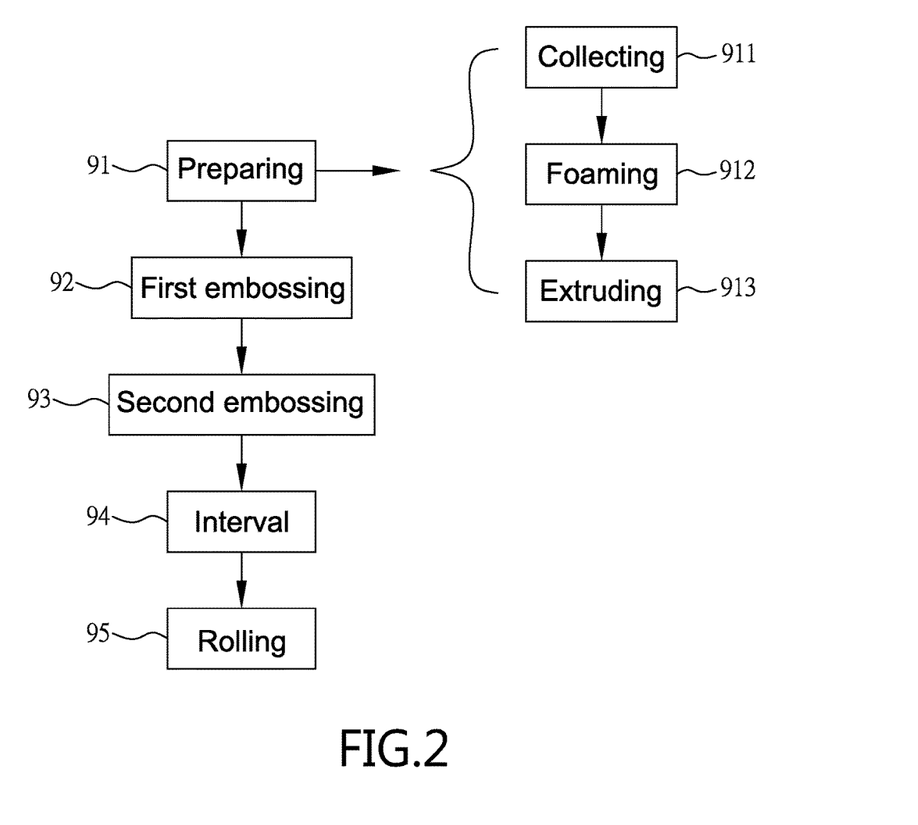
FIG. 2 is a flowchart depicting a first preferred embodiment method according to an embodiment of the present invention.
Figure 3:
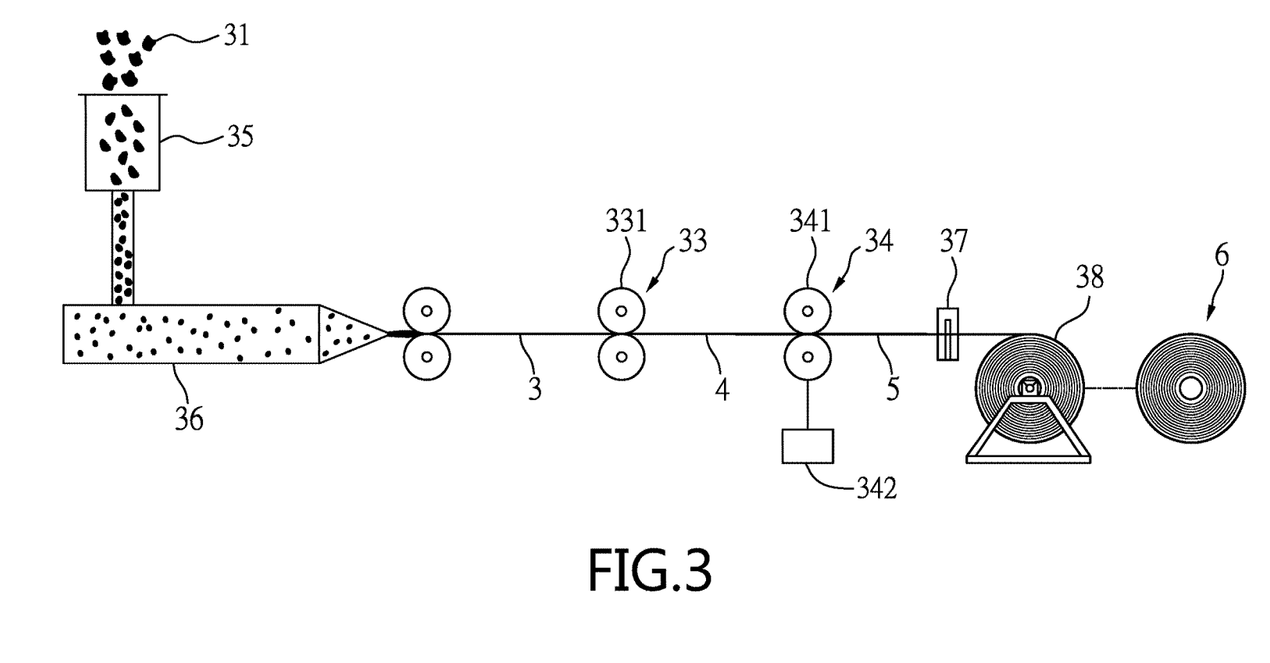
FIG. 3 is a flowchart depicting an arrangement of a first preferred embodiment according to an embodiment of the present invention.
Figure 4:
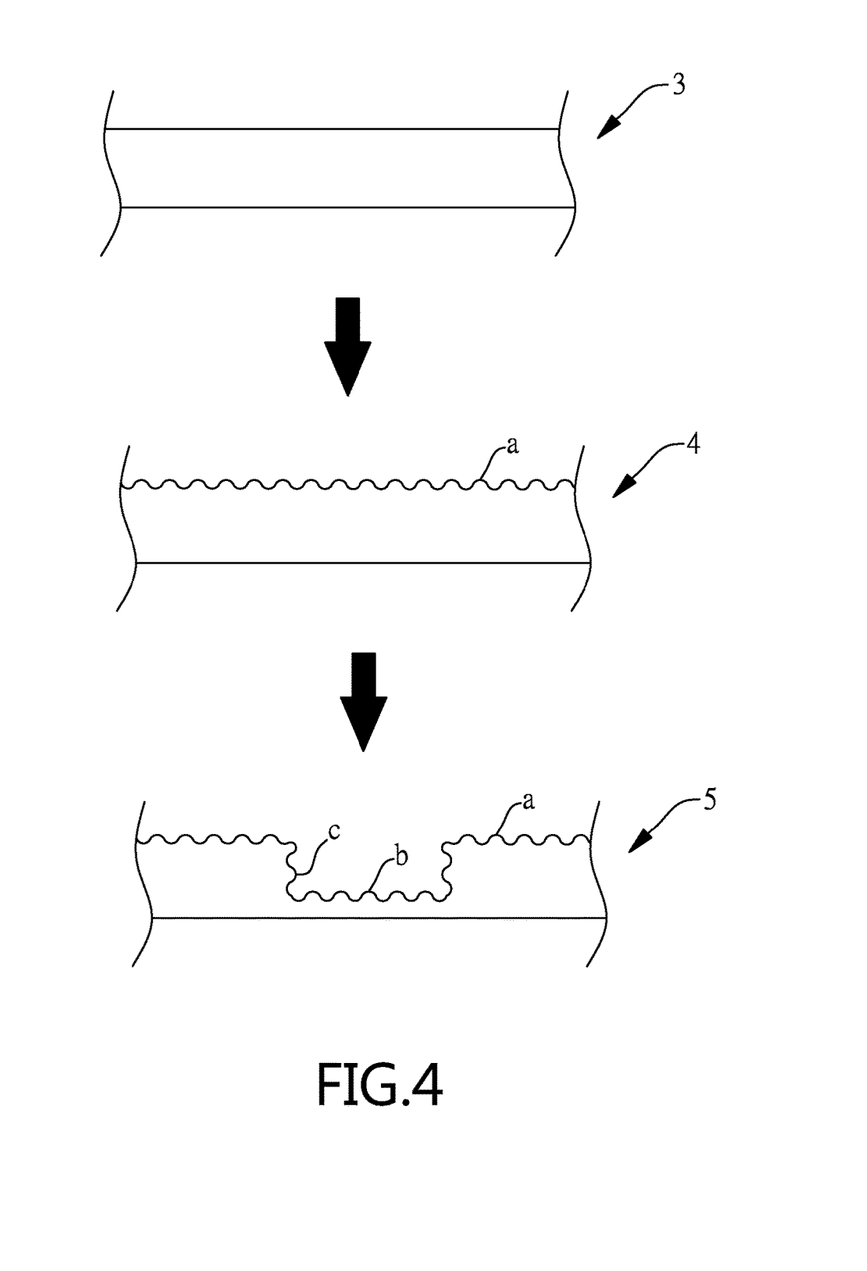
FIG. 4 is a cross-sectional view depicting an unfinished sheet, a first embossed sheet and a second embossed sheet of a first preferred embodiment method according to an embodiment of the present invention.

With reference to FIGS. 2, 3 and 4, a first embodiment of present invention is provided. A method for surface treatment of a thermoplastic polyurethane texture 6 with laminated deep and shallow impressions comprises a preparing step 91, a first embossing step 92, a second embossing step 93, an interval step 94, and a rolling step 95.

First, in the preparing step 91, an unfinished sheet 3 made from a polyurethane material 31 is prepared.

Furthermore, in step 91, the manufacturing method of the unfinished sheet 3 includes a collecting step 911, a foaming step 912, and an extruding step 913.

First, in the collecting step 911, a thermoplastic polyurethane material 31 is prepared which can include one or more of methylene diphenyl diisocyanate, tolylene diisocyanate, polyether polyol, polycarbonate polyol. Furthermore, a hardness of the thermoplastic polyurethane material is preferably in the range of 45 Shore D to 85 Shore A. Based upon user requirements, the thermoplastic polyurethane of different materials and hardness can be selected, so the above materials shall not be construed as limiting the invention.

It is worth mentioning that the texture made from the polyurethane material 31 not only provides good air permeability, water resistance and transparency, but is also biodegradable to reduce environmental pollution, and furthermore can achieve environmentally friendly energy-saving effects.

Next, in the foaming step 912, the thermoplastic polyurethane 31 is foamed by way of an added vesicant. Before the step 912 is performed, the thermoplastic polyurethane is dried out by a dryer 35, so that excess moisture is vaporized to prevent materials from being impacted by surface bubbles in subsequent processes, and the defect rate can thus be reduced.

Finally, in the extruding step 913, the thermoplastic polyurethane 31 is melted and extruded in predetermined amounts to obtain an intermediate unfinished sheet 3. The thermoplastic polyurethane 31 is poured into the inlet of an extruder 36, and extruded from the outlet of the extruder 36 to obtain the unfinished sheet 3.

It is worth mentioning that in the first preferred embodiment, the thermoplastic polyurethane is made by a series of coherent processes. The unfinished sheet 3 can also be delivered to outside processing factory for further processing to obtain the thermoplastic polyurethane texture 6. If the unfinished sheet 3 is delivered to a processing factory, the collecting step 911, the foaming step 912, and the extruding step 913 can be skipped based upon the customer requirements, and shall not be construed as limiting the invention.

Next, in the first embossing step 92, a surface of the unfinished sheet 3 is roll pressed by a first roller set 33 with an embossment and a shallow impression a is printed onto it to obtain a first embossed sheet 4. Moreover, the first roller set 33 is provided with two opposing rollers 331.

The unfinished sheet 3 extruded from the outlet of the extruder 36 enters into the entrance of the two first rollers 331, and is delivered from the exit of the two first rollers 331 to obtain the first embossed sheet 4.

The unfinished sheet 3 having performed the foaming step 912 and the extruding step 913 provides predetermined heat, and at this time, the shallow impression a is formed by the first roller set 33, it can not only save energy otherwise required for heating, but also can save the costs associated with such heating equipment.

Then, in the interval step 93, after the shallow impression a has been printed onto the surface by the first roller set 33 for an interval of 1 to 10 seconds, the second embossing step 94 is then performed.

Table 1 below provides interval times of three different prescriptions for the thermoplastic polyurethane 31. It can be understood that the Shore hardness for Prescription 1 is 85 A, and its melting point is 155° C., with an interval time of 3 seconds; while the Shore hardness for Prescription 2 is 45 D, and its melting point is 90° C., with an interval time of 1 second; the Shore hardness for Prescription 3 is 70 A, and its melting point is 85° C., with an interval time of 8 seconds. From the above data, the thermoplastic polyurethane 31 with different prescriptions affects the hardness and melting points, and so the interval step 93 can be changed based upon the different prescriptions of the thermoplastic polyurethane 31.

TABLE 1

| Ingredient/ Prescription | Shore Hardness | Melting Point (° C.) | Time (sec) |
|---|---|---|---|
| 1 | 85A | 155° C. | 3 |
| 2 | 45D | 90° C. | 1 |
| 3 | 70A | 85° C. | 8 |

Next, in the second embossing step 94, the first embossed sheet 4 with the shallow impression a is double pressed by a second embossing roller set 34 and a deep impression b is printed onto it to obtain a second embossed sheet 5 with the laminated shallow impression a and a deep impression b. In other words, after the shallow impression a has been printed onto the surface by the first roller set 33 for an interval of 1 to 10 seconds, the deep impression b is then printed onto the surface by the second roller set 34.

It is worth mentioning that in the second embossing step 94, the second roller set 34 is provided with two opposing rollers 341, and a cooling unit 342 is connected to the two second rollers 341. A coolant is directed into the second roller set 34 by the cooling unit 342, so the first roll pressed embossed sheet 4 can be cooled and fixed during pressing, and the shallow impression a and the deep impression b of the second embossed sheet 5 is fixed. Hence, the processing time is shortened to prevent the impressions from being deformed or sticking together or other such problems, and the yield rate can be improved.

In other words, the first embossed sheet 4 delivered from the exit of the two first rollers 331 enters into the entrance of the two second rollers 341, and is delivered from the exit of the two second rollers 341 to obtain the second embossed sheet 5.

In the first preferred embodiment, the temperature of the coolant which is delivered into the second roller set 34 is between 25° C. and 20° C. The temperature of the coolant is determined by the heat of the second embossed sheet 5, and the coolant can include chilled water, or an ice crystal compound.

The depth of the impression of the first roller set 33 is determined by the separation distance of the two first rollers 331, and the second roller set 34 is determined by the separation distance of the two second rollers. The closer the two rollers are, the deeper the impression is, or otherwise. Therefore, the separation distance of the two first rollers 331 is farther, and the separation distance of the two second rollers 341 is closer.

The shallow impression a is printed by the first roller set 33 and the deep impression b is printed by the second roller set 34 to obtain the second embossed sheet 5 with laminated shallow and deep impressions a and b, and a side impression c is formed by the different depths of shallow and deep impressions a and b.

Through the side impression c is formed by the different depths, it can achieve an overall 3D decorative effect to satisfy visual impression requirements of consumers.

Finally, in the rolling step 95, the second embossed sheet 5 is cut into predetermined lengths to obtain the thermoplastic polyurethane texture 6. A cutter 37 is utilized to cut the embossed sheet 5, and a roller 38 is provided to roll up the cut thermoplastic polyurethane texture 6 for convenience of delivery and subsequent processing.

Figure 5:
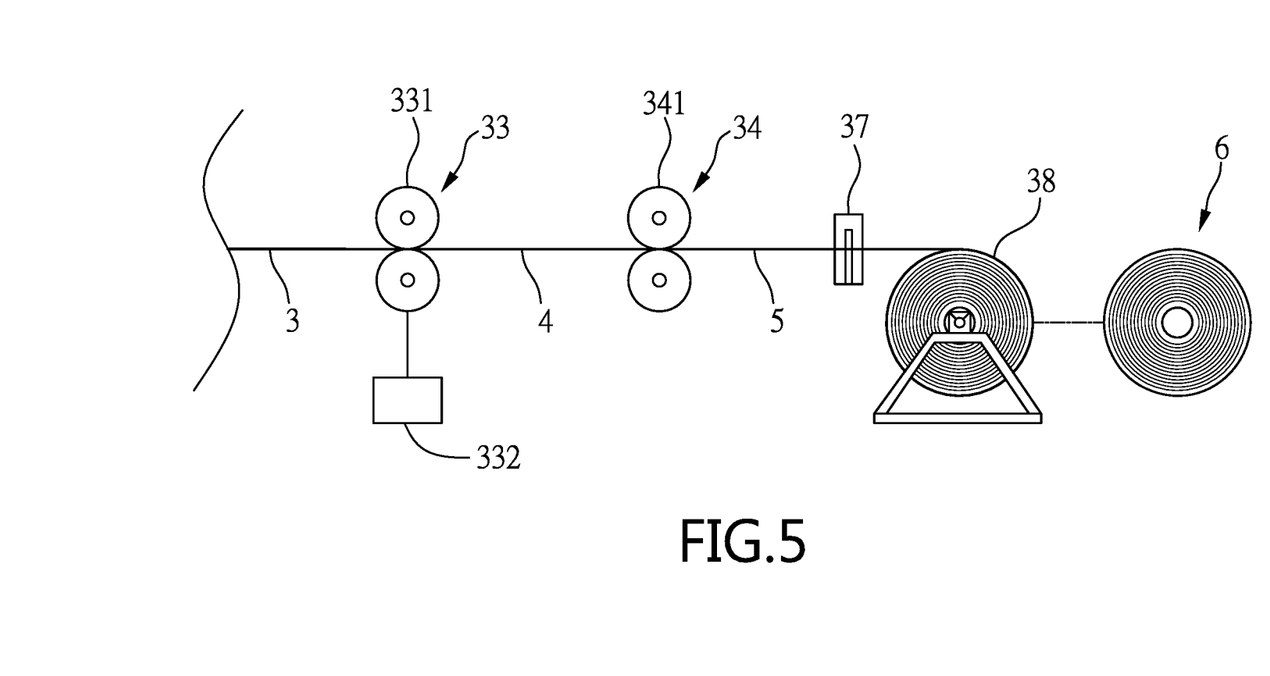
FIG. 5 is a flowchart depicting an arrangement of a second preferred embodiment according to an embodiment of the present invention.

With reference to FIG. 5, a second preferred embodiment of present invention is provided. The second preferred embodiment is similar to the first, and so common features are not described again. A difference is that the surface treatment of the thermoplastic polyurethane texture 6 skips processing by the cooling unit 342, and instead adds a heating unit 332 connected to the two first rollers 331 in the first roller set 33.

The heat is directed into the first roller set 33 by the heating unit 332 connected to the two first rollers 331 and heats the roll pressed unfinished sheet 3. The temperature provided by the heating unit is between 25° C. and 100° C.

The second preferred embodiment concerns the subsequent processing of the unfinished sheet 3, which does not provide any heat. At that time, the unfinished sheet 3 is heated up by the two first heating rollers 331, so that the shallow impression a is printed to satisfy any requirement of the process and to obtain competitive advantages in the market.

Figure 6:
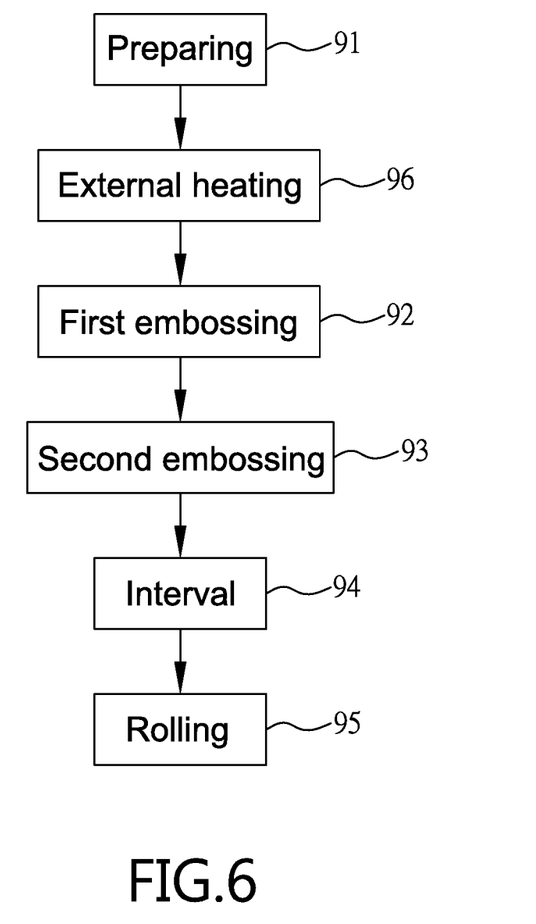
FIG. 6 is a flowchart depicting a third preferred embodiment method according to an embodiment of the present invention.
Figure 7:
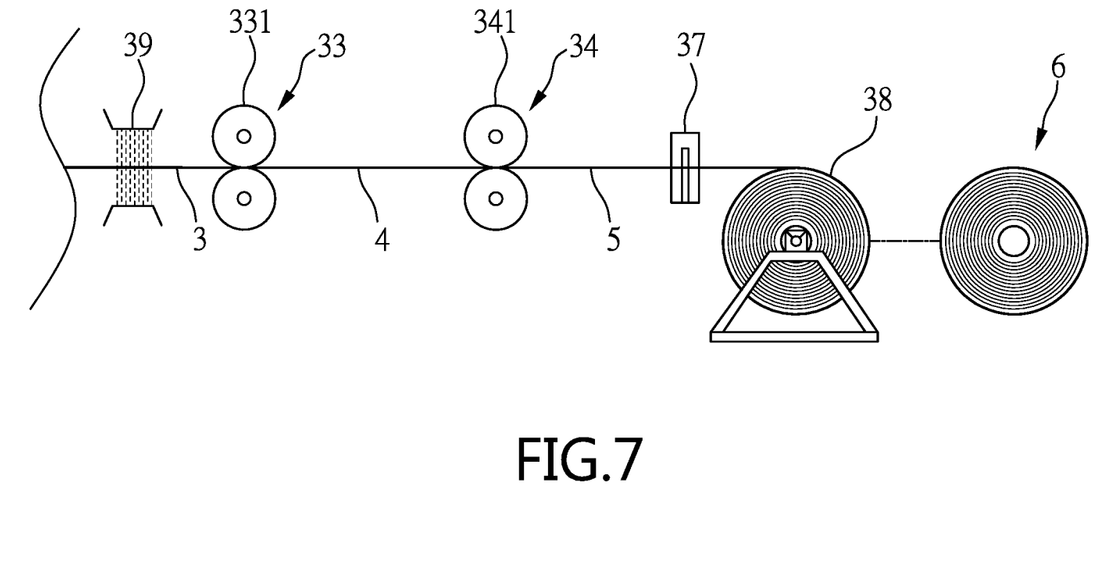
FIG. 7 is a flowchart depicting an arrangement of a third embodiment method according to an embodiment of the present invention.

With reference to FIGS. 6 and 7, a third preferred embodiment of present invention is disclosed. The third embodiment is similar to the second, and so common features are not described again. A difference is that the third embodiment skips the heating unit 332, and adds an external heating step 96 which occurs between the preparing step 91 and the first embossing step 92.

In the external heating step 96, the unfinished sheet 3 is irradiated by an infrared lamp 39 (shown in FIG. 7) to maintain a predetermined temperature. The irradiation temperature of the infrared lamp 39 is between 25° C. and 120° C. In practice, the lighting temperature of the infrared lamp 39 is adjustable based upon the prescription of the thermoplastic polyurethane 31 by the users to soften the unfinished sheet 3 for convenience of the subsequent processes. Moreover, a hot air dryer or oven can be selected for the equipment to heat the unfinished sheet 3, and so shall not be construed as limiting the present invention.

With the aforementioned descriptions, the following benefits of the present method can be obtained:

1. Improved Processing Efficiencies

A coolant is directed into the second roller set 34 by the cooling unit 342, so that the first roll pressed embossed sheet 4 can be cooled and fixed during pressing, and the shallow impression a and the deep impression b of the second embossed sheet 5 can be fixed. Hence, the processing time can be shortened to prevent the impressions from being deformed or sticking together or such problems, and the yield rate can be improved.

2. Simplified Processing and Energy Savings

One to 10 seconds after the shallow impression a is printed onto the surface by the first roller set 33, the deep impression b is directly printed onto the surface by the second roller set 34. It is not necessary to adjust or reverse the angle of the first embossed sheet 4 to print out the deep impression b, thus avoiding processing complications and providing for energy savings.

3. Improvements to the Visual Impression

Through the shallow impression a and deep impression b printed by the first and the second roller sets 33,34, and with the side impression c formed by the different depths, an overall 3D decoration effect is obtained to satisfy consumer requirements for visual impressions.

In conclusion, with the present invention, through a series of steps, a polyurethane material 31 performs a preparing step, a first embossing step, a second embossing step, an interval step and a rolling step to obtain a thermoplastic polyurethane texture 6. Hence, the processing times can be shortened to prevent the impressions from being deformed or sticking together or other such problems, and the yield rate can be improved, thereby providing competitive advantages in the market.

The foregoing detailed description is merely in relation to three preferred embodiments and shall not be construed as limiting the invention. It is to be understood that many other possible modifications and variations can be made without departing from the spirit and scope of the invention as hereinafter claimed.

What is claimed is:

1. A method for surface treatment of a thermoplastic polyurethane texture to provide laminated deep and shallow impressions comprising the following steps:
    a) preparing an unfinished thermoplastic polyurethane sheet;
    b) roll pressing a surface of the unfinished sheet by a first embossed roller set so that a shallow impression is printed onto the surface to obtain a first embossed sheet;
    c) roll pressing the first embossed sheet with the shallow impression by a second embossed roller set so that a deep impression is printed onto the shallow impression to obtain a second embossed sheet with laminated shallow and deep impressions, the deep impression disposed inside the shallow impression to form at least two side impressions extending from the shallow impression to the deep impression; and
    d) cutting the second embossed sheet into predetermined lengths to obtain a thermoplastic polyurethane texture;
    wherein the method for surface treatment further comprises at least one of:
    in step b), the first roller set is provided with two opposing first rollers and a heating unit is coupled to the two first rollers such that heat is directed into the first roller set by the heating unit to heat the roll pressed unfinished sheet, the heat providing a temperature between 25° C. and 100° C.; and
    a step e) that occurs between step a) and step b), wherein in step e), the unfinished sheet is irradiated by an infrared lamp to a predetermined temperature that is between 25° C. and 120° C.

2. A method for surface treatment of a thermoplastic polyurethane texture to provide laminated deep and shallow impressions comprising the following steps:
    a) preparing an unfinished thermoplastic polyurethane sheet;
    b) roll pressing a surface of the unfinished sheet by a first embossed roller set so that a shallow impression is printed onto the surface to obtain a first embossed sheet;
    c) roll pressing the first embossed sheet with the shallow impression by a second embossed roller set so that a deep impression is printed onto the shallow impression to obtain a second embossed sheet with laminated shallow and deep impressions, the deep impression disposed inside the shallow impression to form at least two side impressions extending from the shallow impression to the deep impression; and
    d) cutting the second embossed sheet into predetermined lengths to obtain a thermoplastic polyurethane texture;
    wherein in step a), the unfinished sheet is prepared by the following steps:
    a-1) a thermoplastic polyurethane material is obtained; and
    a-2) the thermoplastic polyurethane material is melted and extruded to obtain an intermediate unfinished sheet;
    wherein in step c), the second roller set is provided with two opposing rollers, and a cooling unit is coupled to the two second rollers such that a coolant is directed into the two second rollers by the cooling unit so that the first roll pressed embossed sheet is cooled and fixed during pressing.

3. The method of claim 1, further comprising a step e) that occurs between step b) and step c), wherein in step e), a delay of 1 to 10 seconds is introduced after the shallow impression is printed onto the surface by the first roller set before the deep impression is printed onto the surface by the second roller set.

4. A method for surface treatment of a thermoplastic polyurethane texture to provide laminated deep and shallow impressions comprising the following steps:
    a) preparing an unfinished thermoplastic polyurethane sheet;
    b) roll pressing a surface of the unfinished sheet by a first embossed roller set so that a shallow impression is printed onto the surface to obtain a first embossed sheet;
    c) roll pressing the first embossed sheet with the shallow impression by a second embossed roller set so that a deep impression is printed onto the shallow impression to obtain a second embossed sheet with laminated shallow and deep impressions, the deep impression disposed inside the shallow impression to form at least two side impressions extending from the shallow impression to the deep impression; and
    d) cutting the second embossed sheet into predetermined lengths to obtain a thermoplastic polyurethane texture;
    wherein in step a), the unfinished sheet is prepared by the following steps:
    a-1) a thermoplastic polyurethane material is obtained; and
    a-2) the thermoplastic polyurethane material is melted and extruded to obtain an intermediate unfinished sheet; and
    a step a-3) that occurs between step a-1) and step a-2), in which the thermoplastic polyurethane material is foamed by way of an added vesicant.

5. The method of claim 4, wherein in step a), the thermoplastic polyurethane material include one or more of methylene diphenyl diisocyanate, tolylene diisocyanate, polyether polyol, polycarbonate polyol.

6. The method of claim 5, wherein a hardness of the thermoplastic polyurethane material is between 45 Shore D and 85 Shore A.

7. The method of claim 1, wherein a temperature of the coolant is between 25° C. and -20° C.

* * * * *